July 12, 1927.          J. PLAUT          1,635,222
FLEXIBLE SOLDER
Filed May 22, 1926
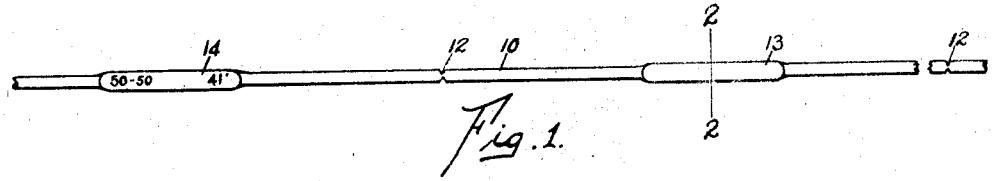
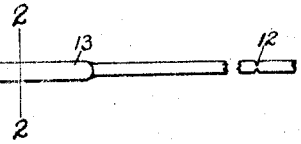
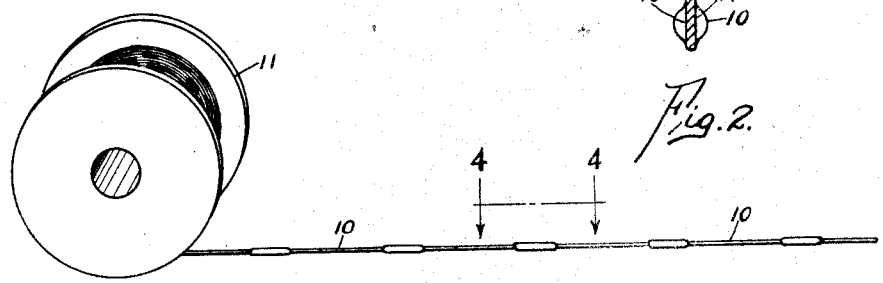
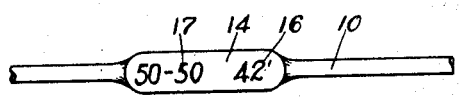
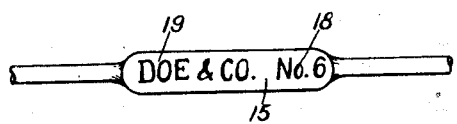
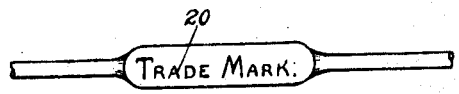
Inventor
Jerome Plaut
By Murray and Gurgetter
Attorneys.

Patented July 12, 1927.

1,635,222

UNITED STATES PATENT OFFICE.

JEROME PLAUT, OF HAMILTON, OHIO.

FLEXIBLE SOLDER.

Application filed May 22, 1926. Serial No. 111,066.

This invention relates to flexible solder, such as string solder, wire solder, strip solder, and the like, and has for an object the provision of means whereby quantities of such solder may be permanently and automatically inventoried and identified throughout as to the quality or alloy thereof.

Another object is to provide flexible solder with means for facilitating economical and accurate disbursement thereof, and to preclude unnecessary waste of material.

These and other objects are attained by the means described herein, and disclosed in the accompanying drawings, in which:

Fig. 1 is a plan view of a section of flexible solder of my invention.

Fig. 2 is a cross sectional view on line 2—2 of Fig. 1.

Fig. 3 is a perspective view of a spool or reel of solder embodying my invention.

Fig. 4 is a view taken on line 4—4 of Fig. 3.

Fig. 5 is a view of the reverse side of Fig. 4.

Fig. 6 is a view similar to Figs. 4 and 5, showing a modification of the identifying means, forming a part of my invention.

Fig. 7 is a view looking at the edge of a card having mounted thereon a quantity of flexible solder of my invention.

In the sale, disbursement, and use of solder, there frequently occurs both mistake and waste, because of the fact that the alloy of the solder is not so marked or associated with a given quantity of solder as to enable the prospective user to determine whether or not he has a solder of the desired alloy. In block solder or bar solder, the alloy may be marked by molding or stamping upon a given unit. Heretofore, in the manufacture, sale, disbursement and use of string solder, or other long flexible sections of solder, the various persons handling said solder would rely entirely upon a suitable identification tag which often became separated from the quantity of solder so that it was impossible to identify the alloy, or gauge of the solder. In addition to this, string solder is frequently disbursed in various lengths chosen at random by the workmen or stockkeeper so that in cost accounting it was practically impossible to keep an accurate record of the quantity of this material used on a particular job. In order to overcome these various disadvantages and difficulties, I have provided a simple and convenient means whereby a flexible solder such as is sold in reels, or on cards, or in short lengths, may be permanently identified as to the alloy or quality, and also as to the gauge, and quantity, and further identified with the name of the manufacturer or trade-mark.

The ordinary string solder is round in cross section and is difficult to identify as to gauge and alloy, and it is troublesome to measure. I have, therefore, disclosed herein one embodiment of my invention as applied to string solder. Referring to Fig. 3, a quantity of string solder 10, for example, one hundred or more feet is wound upon a suitable spool or reel 11. As shown in Fig. 1, the string of solder 10 is notched at intervals indicated as at 12 for providing a convenient means for identifying unit lengths. The distance between adjacent notches 12 may conveniently be made one foot. Intermediate each pair of adjacent notches 12, the body 10 is flattened as at 13 to provide panels 14 and 15, on opposite sides thereof. As shown in Figs. 1 and 4, the quality or alloy is indicated in the usual way by the numerals representing the relative percentage of metals composing the solder. For example, as shown in Fig. 4, the panel 14 bears the mark 50—50, indicating an alloy comprising 50% lead and 50% blocked tin. This panel also bears the legend 42', indicating that the fragmental section shown is the forty-second unit length from the center of the reel 11. The reverse side comprising panel 15 may bear the name of the manufacturer or his trade-mark, and also the gauge or diameter of the solder. (See Figs. 5 and 6). Each panel, beginning with the center of the reel 11, is numbered consecutively, in order to enable anyone to determine at a glance, the quantity of solder remaining on the reel.

The panels being in the center of each unit length form a natural means for grasping a section of solder, so that the solder will normally be used from each end, and, therefore, a partially used unit will always be identifiable. The gauge and trade-mark, or manufacturer's name are also on this portion which is normally the last to be used on each section.

Dealers disbursing short lengths of string solder are able to conveniently stock the severed units, without confusing units of different alloy and gauge.

The various identification marks, indicated at 16, 17, 18, 19 and 20 may be applied in various relation on either or both panels, and are formed by any suitable means which will provide permanent marking, such as stamping, casting, printing, etching, or the like. When the material is made in lengths of many units, the panels may be formed between dies, which carry the desired markings, and these dies may be operated by a suitable machine which will simultaneously form the panels and the markings thereon, and also the notches 12.

If desired, the notches 12 may be omitted, and the units may be severed at a given end of each panel. In this way, one end of each panel serves as an indication of unit length.

As shown in Fig. 7, a relatively small quantity of the solder 10, carrying the panels 14 and 15, may be conveniently wound about a card or the like.

In addition to the advantages previously noted, I have provided means whereby the relatively small pieces of solder, which may remain unused, after finishing a job, are permanently identified, so that these remnants will be readily used by a workman, who might otherwise be inclined to throw them away, as is frequently done by workmen who are in doubt as to the particular alloy of a small piece of solder.

I do not limit myself to the exact positioning of markings as shown in the drawing, as these markings may be rearranged to accommodate different general methods of manufacture and handling. For example, the marks indicating consecutive unit lengths may be omitted in some instances.

What I claim is:

1. As a new article of manufacture, an elongated body of string solder provided at uniform intervals throughout its length with integral panel portions, said panel portions each bearing a permanent legend indicating the alloy of the solder, said panels being consecutively numbered from one end of the body to the other to indicate the number of unit lengths contained between a given end and a given panel.

2. As a new article of manufacture, an elongated cylindrical body of flexible solder having uniformly spaced integral panels each bearing a legend indicating the alloy of the solder, the gauge of the normal body of the solder, and a consecutive numeral indicating the number of unit lengths of solder between a given panel and a given end of the body.

3. As a new article of manufacture, an elongated body of string solder adapted to be wound upon a reel or the like suitably notched throughout its length to provide uniform length indicating means and having integral panels disposed midway between the notches, said panels each carrying a legend indicating the quality, gauge and the consecutive unit length of each unit.

In testimony whereof, I have hereunto subscribed my name this 20th day of May, 1926.

JEROME PLAUT.